H. W. PLEISTER AND J. KARITZKY.
CABLE CLAMP AND BRIDLE RING.
APPLICATION FILED OCT. 4, 1919.
1,365,060.
Patented Jan. 11, 1921.
2 SHEETS—SHEET 1.
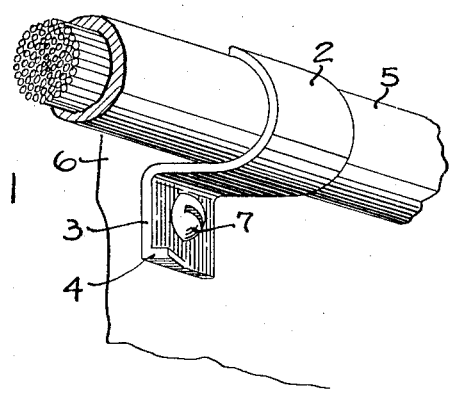
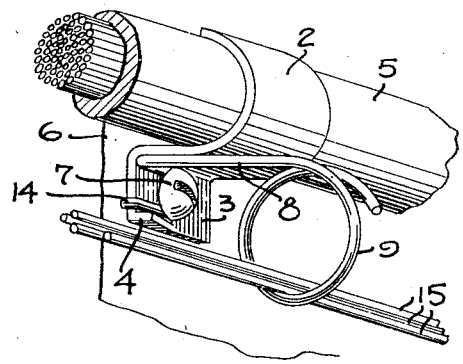
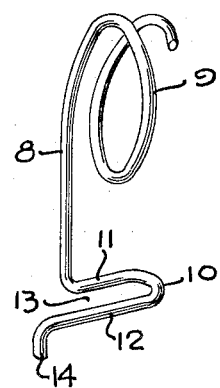
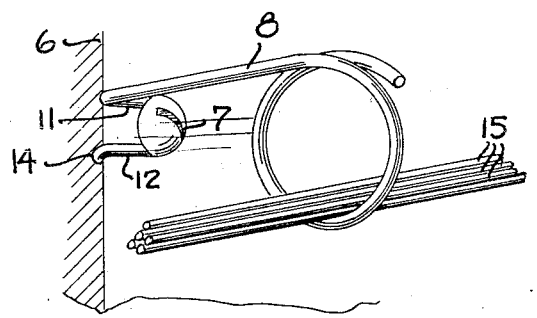
Henry W Pleister
John Karitzky
INVENTORS
BY
Alan M Johnson
ATTORNEY H. W. PLEISTER AND J. KARITZKY.
CABLE CLAMP AND BRIDLE RING.
APPLICATION FILED OCT. 4, 1919.

1,365,060.

Patented Jan. 11, 1921.
2 SHEETS—SHEET 2.

Henry W Pleister
John Karitzky
INVENTORS

BY Alan M Johnson
ATTORNEY

UNITED STATES PATENT OFFICE.

HENRY W. PLEISTER, OF WESTFIELD, AND JOHN KARITZKY, OF GARWOOD, NEW JERSEY, ASSIGNORS TO HENRY B. NEWHALL, JR., EXECUTOR OF HENRY B. NEWHALL, DECEASED.

CABLE-CLAMP AND BRIDLE-RING.

1,365,060.  Specification of Letters Patent.  Patented Jan. 11, 1921.

Application filed October 4, 1919. Serial No. 328,531.

*To all whom it may concern:*

Be it known that we, HENRY W. PLEISTER, a citizen of the United States, residing at Westfield, in the county of Union and State of New Jersey, and JOHN KARITZKY, a citizen of the United States, residing at Garwood, in the county of Union and State of New Jersey, have invented certain new and useful Improvements in Cable-Clamps and Bridle-Rings, of which the following is a specification, taken in connection with the accompanying drawings.

Our invention relates to the combination of a conduit and cable clamp and bridle ring, and also to a cable or conduit clamp and a bridle ring as sub-combinations of the main combination, and as articles of manufacture.

Our invention further relates to a cable and conduit clamp, which can be manufactured at minimum expense and to which a bridle ring may be secured either at the original installation of the cable and conduit clamp, or at any future time when it may be desirable to support one or more runs of bridle wires.

Our invention further relates to a non-threaded bridle ring, which may be used in combination with the conduit or cable clamp or independently. It further relates to such a bridle ring, which can be formed of relatively small gage wire.

Our invention further relates to certain combinations, sub-combinations, articles of manufacture, and details of construction, all of which will be more fully hereinafter described and pointed out in the claims.

In the figures, in which we have shown embodiments of our invention, the same reference numerals refer to similar parts in the several figures.

Figure 1 is a perspective view of our improved conduit and cable clamp, shown supporting a cable to a wall or other suitable support;

Fig. 2 is a perspective view, similar to Fig. 1, but with the addition of our improved pigtail bridle ring;

Fig. 3 is a perspective view of our improved pigtail bridle ring;

Fig. 4 is a detail view, partly in section, of our improved pigtail bridle ring used independently of a conduit or cable clamp, to support runs of bridle wires;

Figure 5:
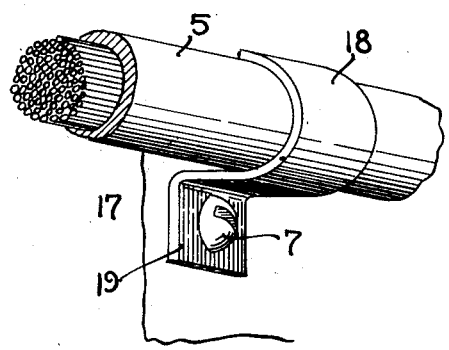
Fig. 5 is a perspective view of our conduit and cable clamp with the tit or shoulder removed.

Previous to our invention bridle rings have been used with conduit and cable clamps. These bridle rings are what are known as "pigtail", having one of their ends provided with machine screw threads to coöperate with machine female screw threads in the heel of the cable clamp. This has necessitated an extra thickness of metal in the heel of the conduit or cable clamp so as to provide sufficient female threads to support the shank of the commercial pigtail bridle ring. When the cable clamp was formed of sheet metal the customary way to get this additional thickness of metal in the heel was to bend over sufficient additional metal to double the thickness of the metal in the heel. This necessitated the use of a large additional quantity of sheet metal with the consequent increase in cost of the resulting cable or conduit clamp.

A pigtail bridle ring provided with wood screw threads can be used separately in wood to support runs of bridle wires, but it cannot be used successfully as a supporting means for a cable clamp. A pigtail bridle ring, provided with machine screw threads, can be used on a cable clamp which has had its heel thickened and tapped with machine screw threads, but such a pigtail bridle ring, provided with machine screw threads, cannot be used independently in a wood or stone structure to support one or more runs of bridle wires. Furthermore such a pigtail bridle ring has to be formed of comparatively heavy or thick gage wire so that it can be properly threaded.

By our invention we can form our pigtail bridle ring of narrow gage or thin wire as it does not have to be threaded. Further, it may be used with a conduit or cable clamp, or may be used independently, to support strands of bridle wires on a wall or other support. When used with a cable clamp the same securing means as, for example, a screw securing the clamp also serves to hold the pigtail bridle ring to the clamp.

In the commercial use of conduit and cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By our invention our conduit and cable clamp may be used as a separate article of manufacture or sub-combination, and then later, when the needs of the service demands it, our bridle ring may be supported by the same conduit or cable clamp, when the complete combination would be used.

In our invention the preferred form of cable clamp 1 is preferably formed out of sheet metal and provided with a hook portion 2, a heel 3, and preferably, though not necessarily, with a shoulder or tit 4. This one hole cable clamp, Fig. 1, secures the cable 5 to the wall or other suitable support 6 by the single screw or fastening means 7.

Our improved pigtail bridle ring 8, consists of a strand of wire of minimum thickness for the load to be carried, having one end provided with convolutions forming a pigtail 9, while the other end is bent back on itself, forming a U shaped member 10, having two arms 11 and 12. The U shaped member forms an open shank, there being an opening or recess 13 between the arms 11 and 12 to receive the screw 7. We also preferably, though not necessarily, bend down the arm 12 to form a toe 14, which serves to take over the side of the heel 3 of the conduit and cable clamp.

Whenever the service may demand that additional wires be strung, runs of bridle wires 15, 15 may be supported on the same conduit and cable clamp 1 by simply loosening the head 7 of the screw and slipping the U shaped member or shank under the head so that its arms 11 and 12 will be engaged by the head of the screw 7. The screw is then tightened, when the pigtail bridle ring will be held firmly to the conduit and cable clamp so that the runs of bridle wires 15, 15 may be strung through the pigtail 9.

When the conduit and cable clamp 1 is used having a shoulder or tit 4, which is the preferred construction, the arm 12 will rest upon the shoulder or tit 4 and serves to assist in holding the pigtail bridle ring in its proper position. The toe 14, engaging on the side of the heel 3, Fig. 2, also assists in preventing any rotary movement of the pigtail bridle ring beneath the head of the screw 7, should the screw work loose after a long term of years.

Our improved pigtail bridle ring can also be used independently of any cable clamp. We have shown it in Fig. 4 in which the screw 7 coöperates with the shank 10 to hold the pigtail bridle ring directly to the wall or other suitable support 16. When so used the toe 14 will bite, or tend to bite, into the wall as shown in Fig. 4, which will prevent any rocking movement of the bridle ring under the head 7, due to any abnormal load that may be thrown upon the bridle ring.

Figure 6:
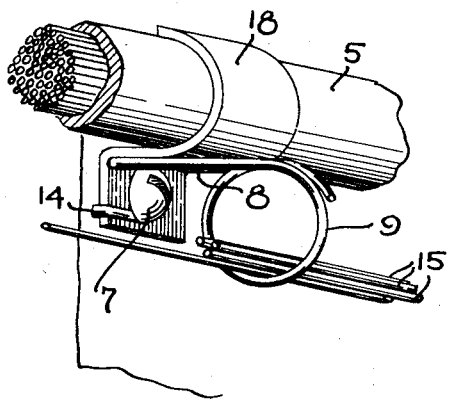
Fig. 6 is a perspective view, similar to Fig. 5, but with the addition of our improved pigtail bridle ring.

Our improved pigtail bridle ring may be used with a conduit and cable clamp 17, Fig. 5, having a hook portion 18 and a heel 19 which is in all respects the same as that shown in Fig. 1, except the conduit and cable clamp is not provided with a tit or shoulder 4 as in the preferred construction. In Fig. 6 we have shown our improved pigtail bridle ring coöperating with the conduit and cable clamp shown in Fig. 5 and held to it by means of the screw 7.

Figure 7:
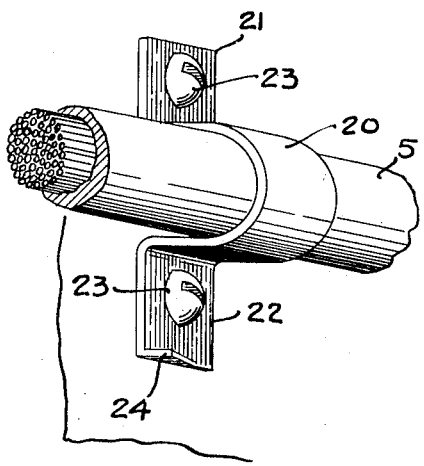
Fig. 7 is a perspective view of a modification in which our invention is shown applied to a two hole cable clamp.

Our invention can also be used with what is commonly known as a two hole conduit and cable clamp. In Fig. 7 we have shown such a two hole conduit or cable clamp 20, having the two heels 21, 22 each provided with openings to receive the two screws 23, 23. The heel 22 is preferably provided with a tit or shoulder 24 to coöperate with the shank of our pigtail bridle ring in the same manner as fully described with relation to Fig. 2 of the drawings.

Figure 8:
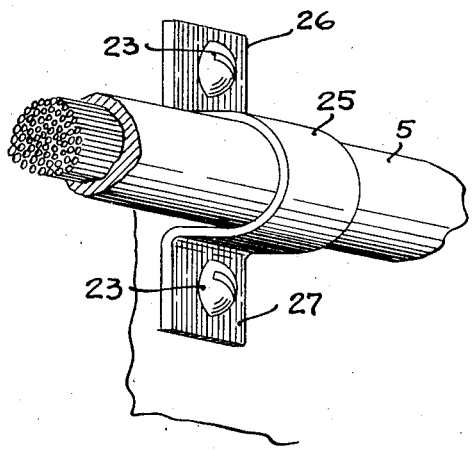
Fig. 8 is a perspective view of a two hole cable clamp, similar to that shown in Fig. 7, but with the omission of the tit or shoulder.

In some cases we may provide a conduit and cable clamp 25, Fig. 8, having a heel portion 26 and a heel portion 27, both of the heel portions being provided with openings to receive the two fastening screws 23, 23. In this form of two hole conduit or cable clamp we do not provide the heel 27 with a tit or shoulder such as shown in Fig. 7. Our pigtail bridle ring is used with such a two hole cable clamp in the same manner as described with the one hole cable clamp of Fig. 6.

Having thus described this invention in connection with illustrative embodiments thereof, to the details of which we do not desire to be limited, what is claimed as new and what is desired to secure by Letters Patent is set forth in the appended claims.

What we claim is:—

1. The combination with a conduit or cable clamp, of a bridle ring having a portion to lie against the conduit or cable clamp, and means engaging over said portion of the bridle ring to clamp the bridle ring between said means and the cable clamp and at the same time secure both to a wall or other suitable support.

2. The combination with a conduit or cable clamp, of a bridle ring having a portion to lie against the conduit or cable clamp, and a screw having a head engaging over said portion of the bridle ring to clamp the bridle ring between said head of the screw and the cable clamp and at the same time secure both to a wall or other suitable support.

3. The combination with a conduit and cable clamp of a nonthreaded bridle ring and means to secure the bridle ring to the clamp and at the same time secure both to a wall or other suitable support.

4. The combination with a conduit and cable clamp of a bridle ring having a shank, and means engaging with the shank and with the cable clamp to secure both to a wall or other support.

5. The combination with a conduit and cable clamp of a bridle ring having a shank and a toe, and means engaging with the shank and with the cable clamp to secure both to a wall or other support.

6. A new article of manufacture comprising a conduit or cable clamp having a hook portion and a heel, the heel being provided on its outer surface with a tit which extends outward from said heel to coöperate with a bridle ring.

7. A new article of manufacture comprising a conduit or cable clamp having a hook portion and a heel, the heel being provided on its outer surface with a tit which extends outward from said heel to coöperate with a bridle ring, and a bridle ring mounted on the outer surface of the heel and coöperating with the tit.

8. A new article of manufacture comprising a conduit and cable clamp having a hook portion and a heel, the heel being provided with a tit to coöperate with a bridle ring, and a bridle ring having a shank adapted to coöperate with the tit.

9. A new article of manufacture comprising a conduit and cable clamp having a hook portion and a heel, the heel being provided with a tit to coöperate with a bridle ring, and a bridle ring having a shank adapted to coöperate with the tit, and provided with a toe or engaging surface.

10. A new article of manufacture comprising a pigtail bridle ring having one end formed into one or more convolutions to secure runs of bridle wires, its other end being bent back on itself in a plane substantially at right angles to the convolutions to form an opening to slip under the head of a securing screw.

11. A new article of manufacture comprising a bridle ring having one end bent back on itself to form a shank with an opening between the bends to receive a securing screw, the extreme end of the shank being bent at an angle to form a toe or engaging surface to bite into the wall or other suitable support.

12. A new article of manufacture comprising a pigtail bridle ring having one end formed into one or more convolutions to secure runs of bridle wires, its other end being bent back on itself in a plane substantially at right angles to the convolutions to form an opening to slip under the head of a securing screw, the very end being bent down at an angle to the opening to form a toe to hook over a cable or conduit clamp or bite into a wall or other suitable support.

HENRY W. PLEISTER.
JOHN KARITZKY.

Witnesses:
A. M. WILLIAMS,
M. R. RYAN.